United States Patent
Dotzler et al.

(10) Patent No.: US 10,723,362 B2
(45) Date of Patent: Jul. 28, 2020

(54) DRIVER ASSISTANCE SYSTEM OPERATING BASED ON AUTONOMOUS STATUSES OF HOST AND LOCAL VEHICLES WHILE IN A MULTI-LEVEL AUTONOMOUS ENVIRONMENT

(71) Applicant: DENSO International America, Inc., Southfield, MI (US)

(72) Inventors: Kevin Dotzler, Poway, CA (US); Jason Graves, Oceanside, CA (US)

(73) Assignee: DENSO International America, Inc., Southfield, MI (US)

( * ) Notice: Subject to any disclaimer, the term of this patent is extended or adjusted under 35 U.S.C. 154(b) by 256 days.

(21) Appl. No.: 15/997,810

(22) Filed: Jun. 5, 2018

(65) Prior Publication Data
US 2019/0367043 A1 Dec. 5, 2019

(51) Int. Cl.
| | |
|---|---|
| *B60W 50/04* | (2006.01) |
| *G05D 1/00* | (2006.01) |
| *G05D 1/02* | (2020.01) |
| *G07C 5/00* | (2006.01) |
| *B60W 50/00* | (2006.01) |

(52) U.S. Cl.
CPC ......... *B60W 50/045* (2013.01); *G05D 1/0061* (2013.01); *G05D 1/0088* (2013.01); *G05D 1/0287* (2013.01); *G07C 5/008* (2013.01); *B60W 2050/0016* (2013.01); *B60W 2050/0017* (2013.01); *B60W 2050/0072* (2013.01); (Continued)

(58) Field of Classification Search
CPC .. G05D 1/0061; G05D 1/0088; G05D 1/0287; G05D 2201/0213; B60W 50/045; B60W 2050/0072; B60W 2050/0089; B60W 2050/0016; B60W 2050/0017
See application file for complete search history.

(56) References Cited

U.S. PATENT DOCUMENTS

| | | | | |
|---|---|---|---|---|
| 5,906,645 A | * | 5/1999 | Kagawa | B60T 7/12 701/23 |
| 6,161,071 A | * | 12/2000 | Shuman | B60K 28/06 340/436 |

(Continued)

FOREIGN PATENT DOCUMENTS

WO  WO-2013128920 A1  9/2013

*Primary Examiner* — Mussa A Shaawat
(74) *Attorney, Agent, or Firm* — Harness, Dickey & Pierce, P.L.C.

(57) ABSTRACT

A system for a host vehicle and includes a memory and a vehicle control module. The memory stores autonomous status bits for each local vehicle. The autonomous status bits indicate whether the corresponding local vehicle is operating in a non-autonomous, semi-autonomous, or fully autonomous mode. The vehicle control module: generates autonomous status bits indicative of an autonomous status level of the host vehicle and transmits the autonomous status bits in a message to first vehicle communication devices; determines that local vehicles are in a local environment of the host vehicle; receives messages including the autonomous status bits of the local vehicles from second vehicle communication devices; and unless operating in a fully autonomous mode, generates a request for a driver of the host vehicle to take control of the host vehicle based on the autonomous status bits of the host vehicle and the local vehicles.

20 Claims, 7 Drawing Sheets

(52) U.S. Cl.
CPC .............. *B60W 2050/0089* (2013.01); *G05D 2201/0213* (2013.01)

(56) References Cited

U.S. PATENT DOCUMENTS

| | | | | |
|---|---|---|---|---|
| 6,363,325 | B1* | 3/2002 | Bates | G08G 1/0965 345/156 |
| 6,714,894 | B1* | 3/2004 | Tobey | G06Q 40/00 702/182 |
| 7,783,426 | B2 | 8/2010 | Kato et al. | |
| 8,655,537 | B2 | 2/2014 | Ferguson et al. | |
| 8,880,273 | B1* | 11/2014 | Chatham | B60W 30/12 701/28 |
| 9,079,587 | B1 | 7/2015 | Rupp et al. | |
| 9,182,764 | B1 | 11/2015 | Kolhouse et al. | |
| 9,304,515 | B2 | 4/2016 | Cudak et al. | |
| 9,330,571 | B2 | 5/2016 | Ferguson et al. | |
| 9,349,284 | B2 | 5/2016 | Cudak et al. | |
| 9,630,625 | B2 | 4/2017 | Shin et al. | |
| 2003/0236602 | A1* | 12/2003 | Kuge | B60W 40/02 701/36 |
| 2004/0080405 | A1* | 4/2004 | Hijikata | B60W 50/16 340/435 |
| 2004/0249550 | A1* | 12/2004 | Yamamura | G08G 1/166 701/96 |
| 2005/0012602 | A1* | 1/2005 | Knoop | G01S 13/867 340/435 |
| 2005/0090984 | A1* | 4/2005 | Kobayashi | B60K 31/0008 701/301 |
| 2005/0131588 | A1* | 6/2005 | Kuge | B60W 40/09 701/1 |
| 2005/0131589 | A1* | 6/2005 | Yamamura | B60T 7/12 701/1 |
| 2005/0209769 | A1* | 9/2005 | Yamashita | G08G 1/017 701/117 |
| 2005/0278093 | A1* | 12/2005 | Kameyama | B60R 16/0373 701/36 |
| 2006/0235615 | A1* | 10/2006 | Kato | B60W 40/04 701/300 |
| 2009/0079839 | A1* | 3/2009 | Fischer | G01S 17/86 348/218.1 |
| 2010/0141518 | A1* | 6/2010 | Hersey | G01C 13/008 342/357.64 |
| 2012/0271489 | A1* | 10/2012 | Roberts | H04L 67/18 701/2 |
| 2013/0310067 | A1* | 11/2013 | Nakata | G01S 11/06 455/456.1 |
| 2015/0148985 | A1 | 5/2015 | Jo | |
| 2015/0331422 | A1* | 11/2015 | Hartung | G05D 1/021 701/23 |
| 2016/0068103 | A1 | 3/2016 | McNew et al. | |
| 2017/0139411 | A1* | 5/2017 | Hartung | G05D 1/0077 |
| 2017/0240109 | A1* | 8/2017 | Kimura | B60R 1/00 |
| 2017/0248949 | A1* | 8/2017 | Moran | B60W 30/085 |
| 2017/0261982 | A1* | 9/2017 | Otaki | B60W 40/09 |
| 2017/0286784 | A1* | 10/2017 | Bhatia | G06K 9/00825 |
| 2018/0025643 | A1* | 1/2018 | Yamamoto | G08G 1/163 701/23 |
| 2019/0071093 | A1* | 3/2019 | Ma | G08G 1/167 |
| 2019/0225210 | A1* | 7/2019 | Herman | G06T 17/00 |

* cited by examiner

DRIVER ASSISTANCE SYSTEM OPERATING BASED ON AUTONOMOUS STATUSES OF HOST AND LOCAL VEHICLES WHILE IN A MULTI-LEVEL AUTONOMOUS ENVIRONMENT

FIELD

The present disclosure relates to fully autonomous and semi-autonomous vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Autonomous capabilities of vehicles are ever increasing. Autonomous vehicles systems include vehicle alert and information systems for informing drivers of impending objects and/or providing driver assistance signals indicating suggested actions to be performed. Some autonomous vehicle systems detect a surrounding environment and control vehicle operations such as steering, braking, and acceleration. Currently, there are vehicles on the road having various levels of autonomous capabilities from vehicles providing no driver assistance to fully autonomous vehicles having no driver input.

SUMMARY

A system for a host vehicle is provided. The system includes a memory and a vehicle control module. The memory is configured to store one or more applications and autonomous status bits for each of one or more local vehicles. The autonomous status bits of each of the one or more local vehicles indicate whether the corresponding local vehicle is operating in a non-autonomous mode, a semi-autonomous mode, or a fully autonomous mode. The vehicle control module is configured to execute the one or more applications and when executing the one or more applications the vehicle control module is configured to: generate autonomous status bits indicative of an autonomous status level of the host vehicle and transmit the autonomous status bits in at least one message to a first one or more vehicle communication devices; determine that one or more of the local vehicles is in a local environment of the host vehicle; receive one or more messages including the autonomous status bits of the one or more local vehicles from a second one or more vehicle communication devices, where the second one or more vehicle communication devices includes the first one or more vehicle communication devices; and unless operating in a fully autonomous mode, generate a request for a driver of the host vehicle to take control of the host vehicle based on (i) the autonomous status bits of the host vehicle, and (ii) the autonomous status bits of the one or more local vehicles.

In other features, a method for a host vehicle is provided. The method includes: storing one or more applications and autonomous status bits for each of one or more local vehicles in a memory, where the autonomous status bits of each of the one or more local vehicles indicate whether the corresponding local vehicle is operating in a non-autonomous mode, a semi-autonomous mode, or a fully autonomous mode; generating autonomous status bits indicative of an autonomous status level of the host vehicle and transmit the autonomous status bits in at least one message to a first one or more vehicle communication devices; and determining that one or more of the local vehicles is in a local environment of the host vehicle. The method further includes: receiving one or more messages including the autonomous status bits of the one or more local vehicles from a second one or more vehicle communication devices, where the second one or more vehicle communication devices includes the first one or more vehicle communication devices; and unless operating in the fully autonomous mode, generating a request for a driver of the host vehicle to take control of the host vehicle based on (i) the autonomous status bits of the host vehicle, and (ii) the autonomous status bits of the one or more local vehicles.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
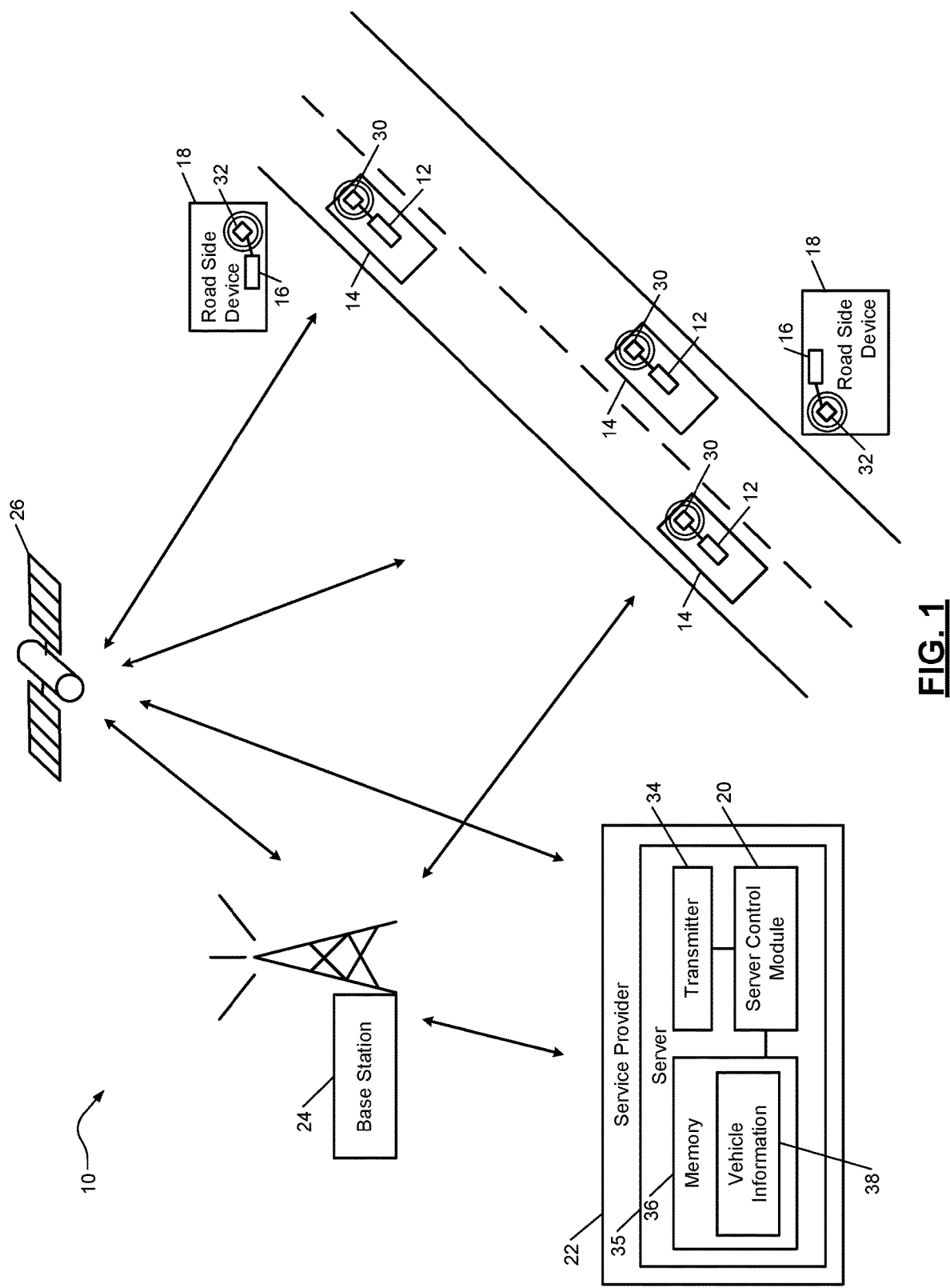
FIG. 1 a functional block diagram of an example of a driver assistance network in a mixed autonomous operating environment in accordance with an embodiment of the present disclosure.

Vehicle communications systems (e.g., a dedicated short range communication (DSRC) system) exist for transferring vehicle information between vehicle communication devices, such as vehicle control modules of different vehicles, road side units (RSUs), base stations, and/or other vehicle communication devices. This information is often transmitted in a basic safety message (BSM). The BSM is an example message transmitted in a DSRC system and may have different naming conventions in alternative vehicle-to-everything (V2X) technology based systems and thus may be simply referred to as a message. A BSM may include two parts. The first part may indicate a position (or location of a vehicle), motion information, brake status, vehicle size, etc. The motion information may indicate a velocity (or speed), an acceleration rate, and/or a heading of the vehicle. The second part may include event flags, path history, path prediction information, and vehicle status information. The second part may include steering angles, brake pedal positions, accelerator pedal positions, etc. Thus, the BSM includes a location of the vehicle, a heading of the vehicle and some historical data.

A BSM is limited in that the BSM does not traditionally include autonomous information, such as an autonomous state of a vehicle. Vehicles may have various levels of autonomous capability. The autonomous state refers to the autonomous level of operation. A traditional vehicle for which a driver controls the vehicle without any assistance from, a vehicle control module, may have an autonomous level of 0. On the other hand, a fully autonomous vehicle where the vehicle control module (or modules) fully controls operation of the vehicle without any driver input may have an autonomous level of greater than or equal to 5. A vehicle may operate in different semi-autonomous modes with varying levels of provided driver assistance. The semi-autonomous modes are typically referred to as levels 2-4. Certain vehicles may operate in only one of a non-autonomous mode, a semi-autonomous mode, and a fully autonomous mode. Other vehicles may switch between operating in a non-autonomous mode, one or more of the semi-autonomous modes and/or the fully autonomous mode.

The examples set forth herein include driver assistance systems that detect, monitor, and report autonomous status states of host vehicles and local vehicles and operate based on the autonomous status states. A local vehicle refers to a vehicle in close proximity (or within predetermined distances of) a host vehicle. The autonomous status states may be reported in BSMs and/or other transmitted messages and/or communication signals. As an example embodiment, a BSM may include core data, vehicle extension data and regional extension data. The core data may include: temporary identifiers of a host or local vehicle; timing information accurate to a millisecond; and latitude and longitude coordinates, elevations, transmission states, speeds, headings, steering wheel angles, acceleration rates, brake system states, and/or sizes of the host or local vehicle. The vehicle extension data may include path history and path extension data of the host or local vehicle. The regional extension data may include autonomous status information including autonomous status states of the host or local vehicle.

In an environment where vehicles having varying levels of autonomous control, providing indications of autonomous status states can assist vehicle control modules in predicting driver behavior and/or vehicle behavior and as a result improve operation of driver assistance systems. This includes improving semi-autonomous assistance and/or control and fully autonomous control, as well as improving collision avoidance, traffic lane guidance, adaptive cruise control operation, etc.

The autonomous status information is shared with vehicle control modules of vehicles, such that the vehicle control modules have information indicating whether nearby vehicles are controlled by drivers (i.e. operating in non-autonomous modes), are operating in a semi-autonomous mode, or are fully autonomous. This enables improved driver assistance control logic, especially in areas where a majority of vehicles are operating in semi-autonomous or fully autonomous modes. The autonomous status information allows a driver assistance system of a semi-autonomous or fully autonomous vehicle to account for local vehicles operating non-autonomously. The semi-autonomous and fully autonomous vehicles may perform cooperative behavioral tasks. Performance of cooperative behavioral tasks may be based on whether there is a non-autonomous vehicle nearby. Cooperative behavioral operation may be limited and/or prevented when a non-autonomous vehicle is nearby.

FIG. 1 shows a driver assistance network 10 in a mixed autonomous operating environment. The driver assistance network 10 may include various vehicle communication devices (or devices that transmit vehicle related information), such as vehicle control modules 12 of vehicles 14, road side control modules 16 of road side units (or road side devices) 18, a server control module 20 of a service provider 22, and/or other vehicles communication devices, such as communication devices in a base station 24 or a satellite 26. The vehicle related information may include BSMs as described above and/or other messages and/or signals including information pertaining to the vehicles 14 and/or objects within predetermined distances of the vehicles 14.

The vehicles 14 include the vehicles control modules 12 and transmitters 30 for vehicle-to-vehicle communication and communication with the other vehicle communication devices, such as communication with transmitters 32, 34 of the road side devices 18 and the service provider 22. The service provider 22 may include a server 35, which includes the server control module 20, the transmitter 34, and a memory 36. The memory 36 may store vehicle information, such as that described herein, which may be shared with the vehicles 14.

The driver assistance network may be a DSRC network, a cellular vehicle-to-everything (C-V2X) network, or other vehicle information sharing network including V2X communication. As an example, the DSRC network may be a 1-way or 2-way short to medium range wireless communication system using 75 mega-hertz (MHz) of spectrum in a 5.9 giga-hertz (GHz) band, which is allocated for transfer of automotive information.

Figure 2:
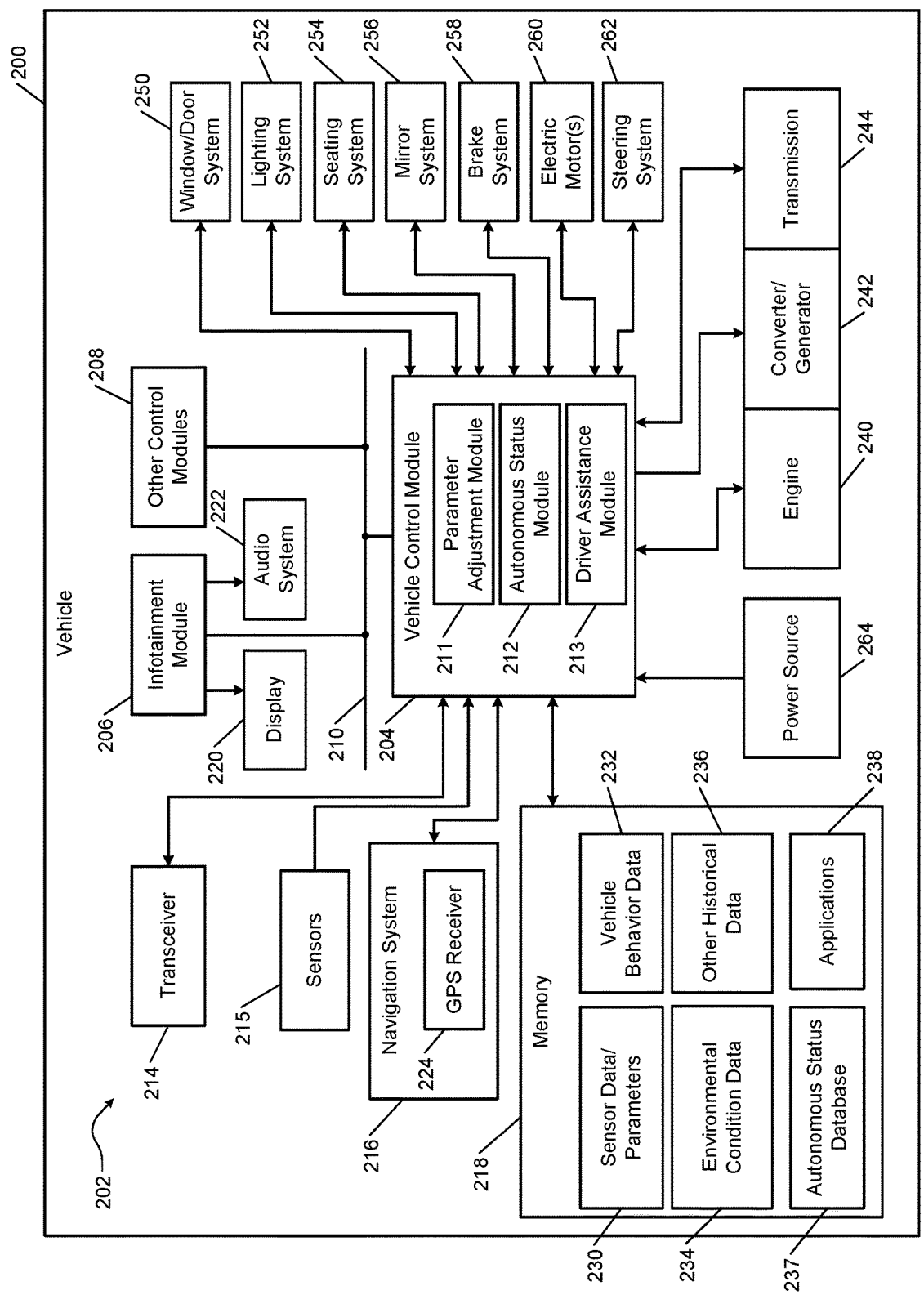
FIG. 2 is a functional block diagram of an example of a vehicle including a driver assistance module operating in accordance with an embodiment of the present disclosure.

FIG. 2 shows vehicle 200 that is an example of one of the vehicles 14 of FIG. 1. The vehicle 200 includes driver assistance system 202, which includes a vehicle control module 204, an infotainment module 206 and other control modules 208. The modules 204, 206, 208 may communicate with each other via a controller area network (CAN) bus 210. The vehicle control module 204 may provide varying levels of driver assistance and control operation of vehicles systems. The vehicle control module 204, may include a parameter adjustment module 211, an autonomous status module 212, a driver assistance module 213 and/or other modules, such as an engine control module, a transmission control module, and a motor control module, etc. The parameter adjustment module 211 may be used to adjust parameters of the vehicle 200. The autonomous status module 212 may determine the autonomous statuses of the host vehicle 200 and other local vehicles. The driver assistance module 213 may generate alert signals and/or control operation of the vehicle systems, as further described below.

The driver assistance system 202 may further include a transceiver 214, sensors 215, a navigation system 216, a memory 218, a display 220 and an audio system 222. The sensors 215 may include cameras, objection detection sensors, temperature sensors, accelerometers, vehicle velocity sensor, and/or other sensors that provide parameters and/or data associated with the state of the vehicle 200, state of objects within the vehicle, and/or information regarding an environment in which the vehicle 200 is located. The sensors 215 detect environmental conditions and status of vehicle devices. The navigation system 216 may include a global positioning system (GPS) receiver 224. The GPS receiver 224 may provide vehicle velocity and/or direction (or heading) of the vehicle. The vehicle control module 204 transmits at least some of the data collected from the sensors 215 to other vehicle communication devices.

The memory 218 may store sensor data and/or parameters 230, vehicle behavior data 232, environmental condition data 234, other historical data 236, an autonomous status database 237, and applications 238. The autonomous status database 237 may include BSMs and/or other vehicle information containing messages and/or signals generated by the vehicle 200 (or host vehicle) and/or received from other vehicles. The applications 238 may include applications executed by the modules 204, 206, 208. As an example, one of the applications may be a driver assistance application executed by the driver assistance module 213.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208. The vehicle control module 204 may perform operations for collision avoidance, traffic lane guidance, adaptive cruise control, parking assistance, and/or other autonomous assistance activities. The vehicle control module 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 204 to, for example, adjust fuel, spark, air flow, steering wheel angle, throttle position, pedal position, door locks, window position, seat angles, etc. This control may be based on the outputs of the sensors 215, the navigation system 216, the GPS 224 and the above-stated data stored in the memory 218 including the autonomous status data of the autonomous status database 237.

Figure 3:
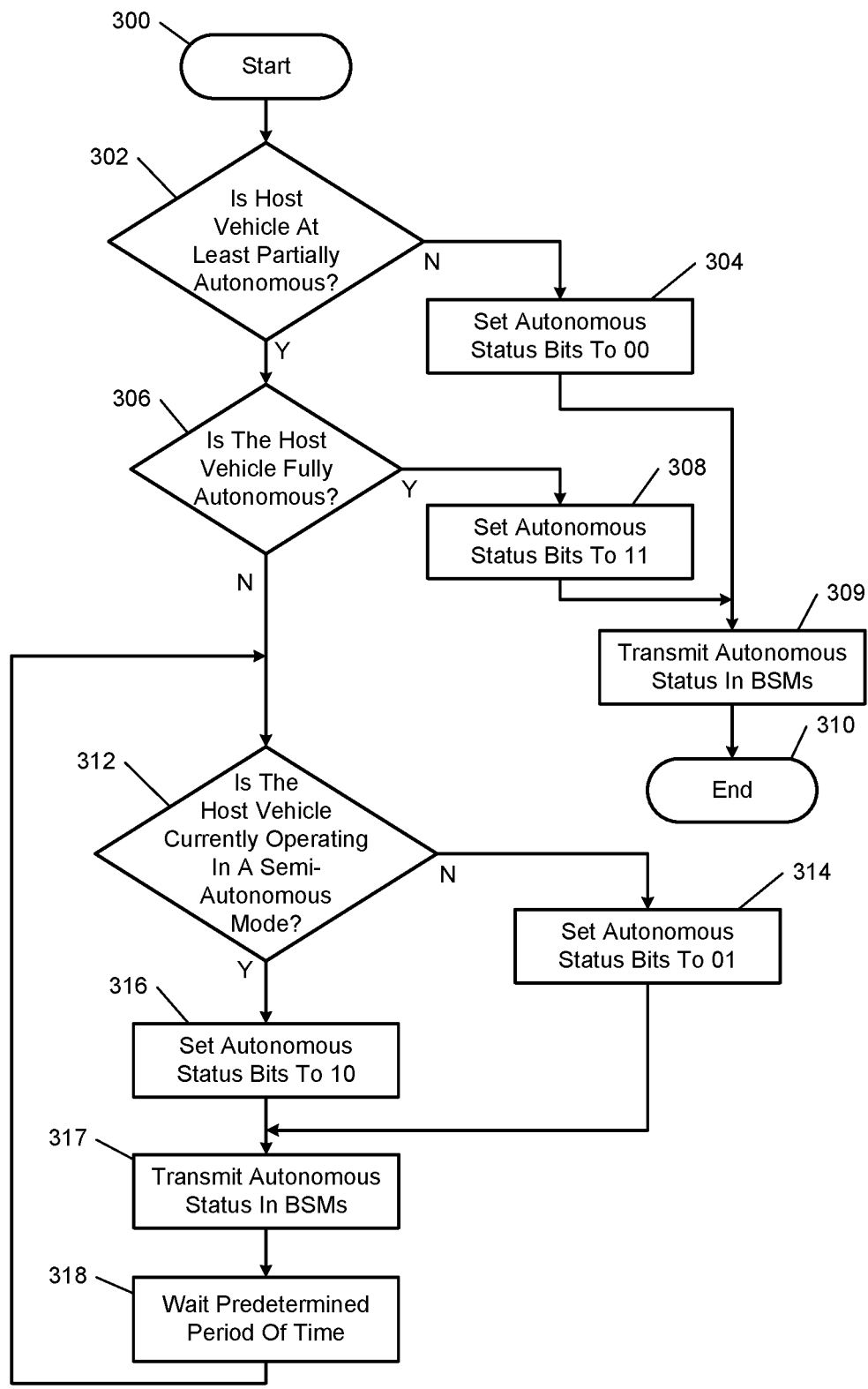
FIG. 3 illustrates an autonomous status setting method in accordance with an embodiment of the present disclosure.

The systems disclosed herein may be operated using numerous methods, example methods are illustrated in FIGS. 3-6. In FIG. 3, an autonomous status setting method is shown. Although the methods are shown as separate methods, one or more of the methods and/or operations from separate methods may be combined and performed as a single method. For example, one or more of the methods of FIGS. 3-5 may be performed in combination with the method of FIG. 6. Although the following operations are primarily described with respect to the implementations of FIG. 3, the operations may be easily modified to apply to other implementations of the present disclosure. The operations may be iteratively performed and may be performed by the autonomous status module 212.

The method may begin at 300. At 302, the autonomous status module 212 determines whether a host vehicle (e.g., the vehicle 200) is at least partially autonomous meaning the host vehicle is enabled to operate in a semi-autonomous mode or a fully autonomous mode. This may be determined, for example, when the vehicle control module 204 is initially installed in the host vehicle and based on information received by the vehicle control module 204 and/or stored in the memory 218. The information may be received from a device (e.g., a manufacturer programming device) separate from and/or remotely located away from the host vehicle and indicate the autonomous capabilities of the vehicle. If the host vehicle is not at least partially autonomous, then operation 304 is performed and autonomous status bits may be set to 00 if not already set, otherwise operation 306 is performed. The autonomous status bits 00 indicate that the host vehicle has no autonomous capabilities. The autonomous status bits may be stored as part of the autonomous status database 237.

At 306, the autonomous status module 212 determines whether the host vehicle is fully autonomous. While in the fully autonomous mode, driver inputs and/or intervention are not needed. This may be based on the information received by the vehicle control module 204 and/or stored in the memory 218. If fully autonomous, then operation 308 is performed and the autonomous status bits may be set to 11 if not already set, otherwise operation 312 may be performed. Subsequent to performing operations 304 and 308, operation 309 may be performed to transmit the autonomous status bits as part of a BSM or the like. The BSM may be transmitted as described herein from the host vehicle to other local vehicles, base stations, satellites, gateways, mobile network devices, and/or other vehicle communication devices. The method may end at 310 subsequent to performing operation 309.

At 312, the autonomous status module 212 determines whether the host vehicle is currently operating in a semi-autonomous mode. If the host vehicle is not currently operating in a semi-autonomous mode, then operation 314 is performed and the autonomous status bits may be set to 01, otherwise operation 316 is performed and the autonomous status bits may be set to 10. The autonomous status bits 01 and 10 indicate that the host vehicle is capable of operating in dual modes, specifically a non-autonomous mode (or driver control mode) and a semi-autonomous mode, where at least some autonomous operations are performed. The autonomous status bits 01 indicate that the host vehicle is in the non-autonomous mode. The autonomous status bits 10 indicate that the host vehicle is in the semi-autonomous mode. Subsequent to operations 314 and 316, operation 317 is performed. At 317, the autonomous status bits may be transmitted as part of a BSM or the like. The BSM may be transmitted as described herein from the host vehicle to other local vehicles, base stations, satellites, gateways, mobile network devices, and/or other vehicle communication devices. At 318, the autonomous status module 212 waits a predetermined period (e.g., 100 milli-seconds (ms)) and/or for a status change interrupt prior to returning to operation 312.

The autonomous status setting indicated by the autonomous status bits and determined while performing the method of FIG. 3 may be transmitted to surrounding vehicles as part of a BSM and/or the like. The systems disclosed herein may rely on the vehicles of a local vehicle group having knowledge of the autonomous status settings of the vehicles in that group. The driver assistance system 202 of FIG. 2 may rely on the vehicle status settings of the vehicles in the corresponding local vehicle group.

Figure 4:
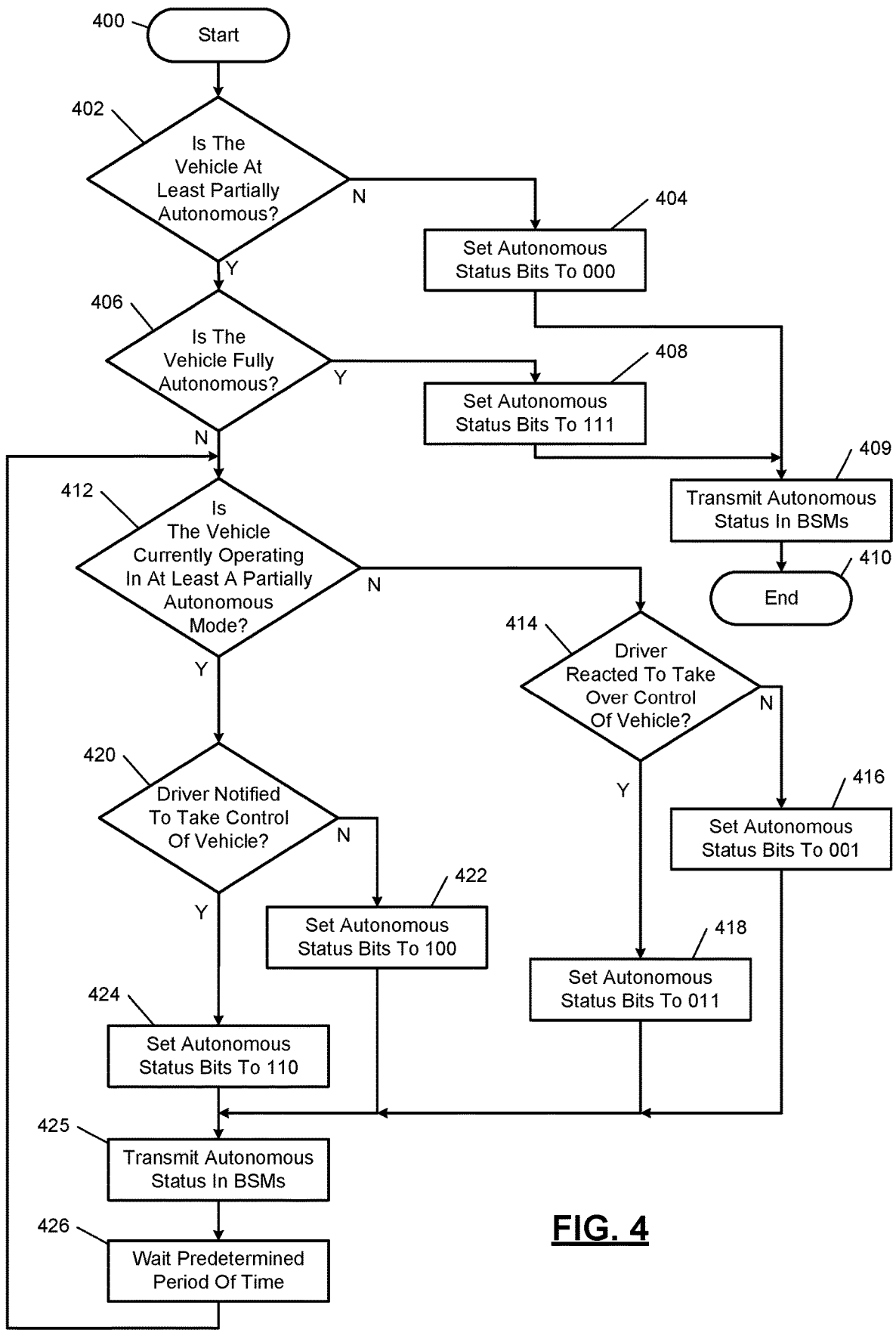
FIG. 4 illustrates another autonomous status setting method in accordance with an embodiment of the present disclosure.

FIG. 4 shows another autonomous status setting method. Although the following operations are primarily described with respect to the implementations of FIG. 4, the operations may be easily modified to apply to other implementations of the present disclosure. The operations may be iteratively performed.

The method may begin at 400. At 402, the autonomous status module 212 determines whether a host vehicle (e.g., the vehicle 200) is at least partially autonomous. This may be determined, for example, when the vehicle control module 204 is initially installed in the host vehicle and based on information received by the vehicle control module 204 and/or stored in the memory 218. The information may be received from a device (e.g., a manufacturer programming device) separate from and/or remotely located away from the host vehicle and indicate the autonomous capabilities of the vehicle. If the host vehicle is not at least partially autonomous, then operation 404 is performed and autonomous status bits may be set to 000 if not already set, otherwise operation 406 is performed. The more autonomous status bits the more details may be identified. Although the methods of FIGS. 3-4 are described for two-bit and three-bit examples, the autonomous status bits may include 2 or more bits. The autonomous status bits 000 indicate that the host vehicle has no autonomous capabilities. The autonomous status bits may be stored as part of the autonomous status database 237.

At 406, the autonomous status module 212 determines whether the host vehicle is fully autonomous. While in the fully autonomous mode, driver inputs and/or intervention are not needed. This may be based on the information received by the vehicle control module 204 and/or stored in the memory 218. If fully autonomous, then operation 408 is performed and the autonomous status bits may be set to 111 if not already set, otherwise operation 412 may be performed. Subsequent to performing operations 404 and 408, operation 409 may be performed to transmit the autonomous status bits as part of a BSM or the like. The BSM may be transmitted as described herein from the host vehicle to other local vehicles, base stations, satellites, gateways, mobile network devices, and/or other vehicle communication devices. The method may end at 410 subsequent to performing operation 409.

At 412, the autonomous status module 212 determines whether the host vehicle is currently operating in a semi-autonomous mode. If the host vehicle is not currently operating in a semi-autonomous mode, then operation 414 is performed, otherwise operation 420 is performed.

At 414, the autonomous status module 212 determines whether the driver of the host vehicle has reacted to take over control of the vehicle. If the driver has not reacted, operation 416 is performed and the autonomous status bits are set to 001, otherwise operation 418 is performed and the autonomous status bits are set to 011. The autonomous status bits 001 and 011 indicate that the host vehicle is able to operate in dual-modes, specifically a non-autonomous mode (or driver control mode) and a semi-autonomous mode, where at least some autonomous operations are performed. The autonomous status bits 001 indicate that the host vehicle is in the non-autonomous mode without the driver reacting to a request by the vehicle control module 204 to operate in the non-autonomous mode. The autonomous status bits 011 indicate that the host vehicle is in the non-autonomous mode due to the driver reacting to a request by the vehicle control module 204 to operate in the non-autonomous mode.

At 420, the autonomous status module 212 determines whether the driver has been notified to take control of the vehicle. In certain conditions, the vehicle control module 204 may signal the driver to take control of the vehicle. This may occur, for example: when there is a non-autonomous vehicle nearby; when distance between the host vehicle and an object is less than a predetermined amount and the object is getting closer to the host vehicle; and/or for other reasons. If the driver has not been notified to take control, operation 422 is performed and the autonomous status bits are set to 100, otherwise the autonomous status bits are set to 110.

The autonomous status bits 100 and 110 indicate that the host vehicle is able to operate in the dual-modes, specifically the non-autonomous mode and the semi-autonomous mode. The autonomous status bits 100 indicate that the host vehicle is in a semi-autonomous mode and the driver has been notified to take control of the vehicle. The autonomous status bits 110 indicate that the host vehicle is in a semi-autonomous mode and the vehicle control module 204 has not requested that the driver take control of the host vehicle.

Operation 425 may be performed subsequent to performing operations 416, 418, 422, 424. At 425, the autonomous status bits may be transmitted as part of a BSM or the like. The BSM may be transmitted as described herein from the host vehicle to other local vehicles, base stations, satellites, gateways, mobile network devices, and/or other vehicle communication devices. At 426, the autonomous status module 212 waits a predetermined period (e.g., 100 ms) and/or for a status change interrupt before returning to operation 412.

Figure 5:
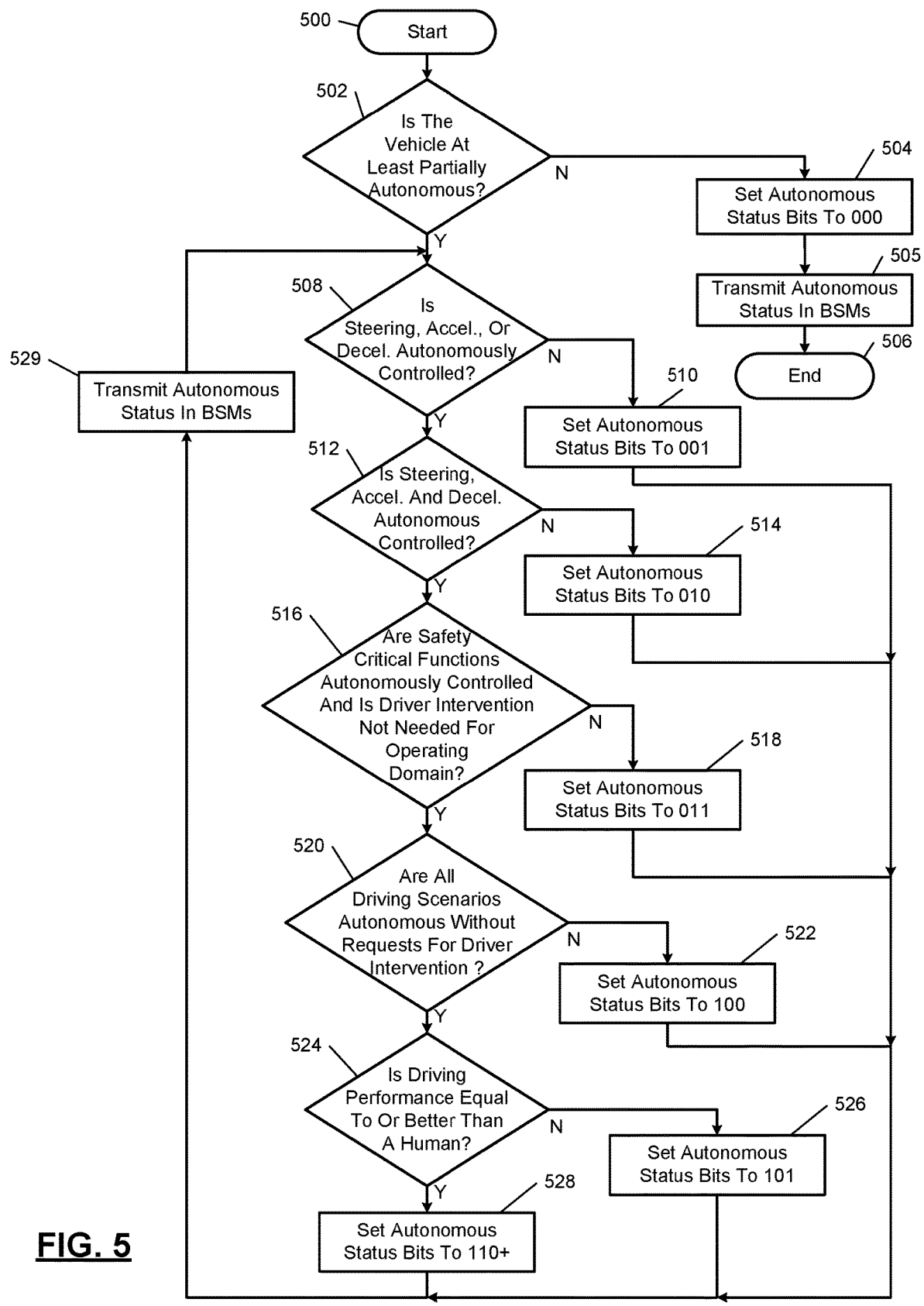
FIG. 5 illustrates yet another autonomous status setting method in accordance with an embodiment of the present disclosure.

FIG. 5 shows yet another autonomous status setting method. Although the following operations are primarily described with respect to the implementations of FIG. 5, the operations may be easily modified to apply to other implementations of the present disclosure. The operations may be iteratively performed.

The method may begin at 500. At 502, the autonomous status module 212 determines whether the host vehicle is at least partially autonomous as described above. If the host vehicle is not at least partially autonomous, then operation 504 is performed and autonomous status bits may be set to 000 (referred to as level 0) if not already set, otherwise operation 508 is performed. Subsequent to performing operation 504, operation 505 may be performed to transmit the autonomous status bits as part of a BSM or the like. The BSM may be transmitted as described herein from the host vehicle to other local vehicles, base stations, satellites, gateways, mobile network devices, and/or other vehicle communication devices. The method may end at 506 subsequent to performing operation 505.

At 508, the autonomous status module 212 determines whether steering, acceleration, or deceleration (e.g., steering wheel angle, accelerator pedal position, or brake pedal position) is autonomously controlled. If none of steering, acceleration and deceleration are autonomously controlled, then operation 510 is performed to set autonomous status bits to 001 (referred to as level 1), otherwise operation 512 is performed.

At 512, the autonomous status module 212 determines whether steering, acceleration and deceleration are autonomously controlled. If steering, acceleration and deceleration are not autonomously controlled, the operation 514 is performed to set the autonomous status bits to 010 (referred to as level 2), otherwise operation 516 is performed.

At 516, the autonomous status module 212 determines whether safety critical functions autonomously controlled and whether driver intervention is not needed for a current operating domain. The safety critical functions may include steering, acceleration, and deceleration. The safety critical functions may also include other functions, such as control of lights and/or vehicle signaling. The current operating domain may refer to a current geographical location of the vehicle, a current range of vehicle speed, an amount of traffic, current weather conditions, and/or other environment and/or vehicle conditions. If safety critical functions are not autonomously controlled and/or driver intervention is needed for the current operating domain, then operation 518 is performed to set the autonomous status bits to 011 (referred to as level 3), otherwise operation 520 is performed.

At 520, the autonomous status module 212 determines whether the vehicle is autonomously controlled in all known driving scenarios without generation of requests for driver intervention. If not all of the known driving scenarios are autonomous, then operation 522 is performed to set the autonomous bits to 100 (referred to as level 4), otherwise operation 524 is performed.

At 524, the autonomous status module 212 determines whether driving performance of the host vehicle while being autonomously controlled is equal to or better than driving performance while under human control. This may be based on average speed, average mileage, acceleration rates, deceleration rates, number of miles traveled, etc. If driving performance is worse while being autonomously controlled, then operation 526 is performed to set the autonomous bits to 101 (referred to as level 5), otherwise operation 528 is performed to set the autonomous bits to 110 (referred to as level 6) or a binary value greater than or equal to 110. Subsequent to performing operations 510, 514, 518, 522, 526 and 528, operation 529 may be performed to transmit the autonomous status bits as part of a BSM or the like. The BSM may be transmitted as described herein from the host vehicle to other local vehicles, base stations, satellites, gateways, mobile network devices, and/or other vehicle communication devices. Operation 508 may be performed subsequent to operation 529.

While operating at levels 1-3 driver intervention may be requested while in certain environments and/or while under certain surrounding or local vehicle conditions. While operating at level 4, driver intervention may be requested under certain driving scenarios. While operating at level 5, driver intervention is not requested and the host vehicle is autonomously controlled with driving performance being equal to that provided if the host vehicle were controlled by the driver. While operating at levels greater than 5, driver intervention is not requested and the host vehicle is autonomously controlled with driving performance being better than that provided if the host vehicle were controlled by the driver.

Figure 6A:
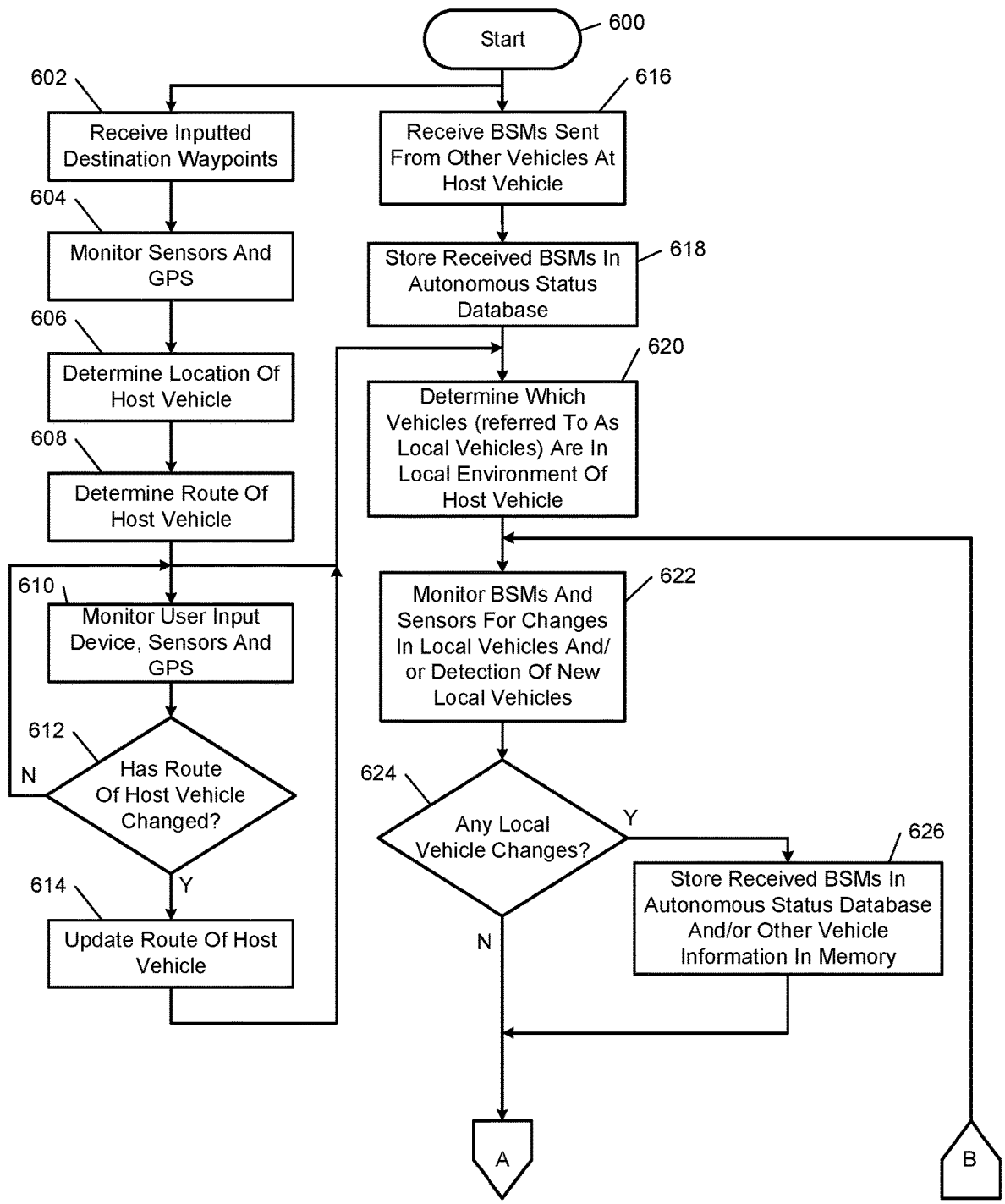
FIGS. 6A and 6B illustrate a driver assistance method that is based on autonomous statuses of vehicles in accordance with an embodiment of the present disclosure.
Figure 6B:
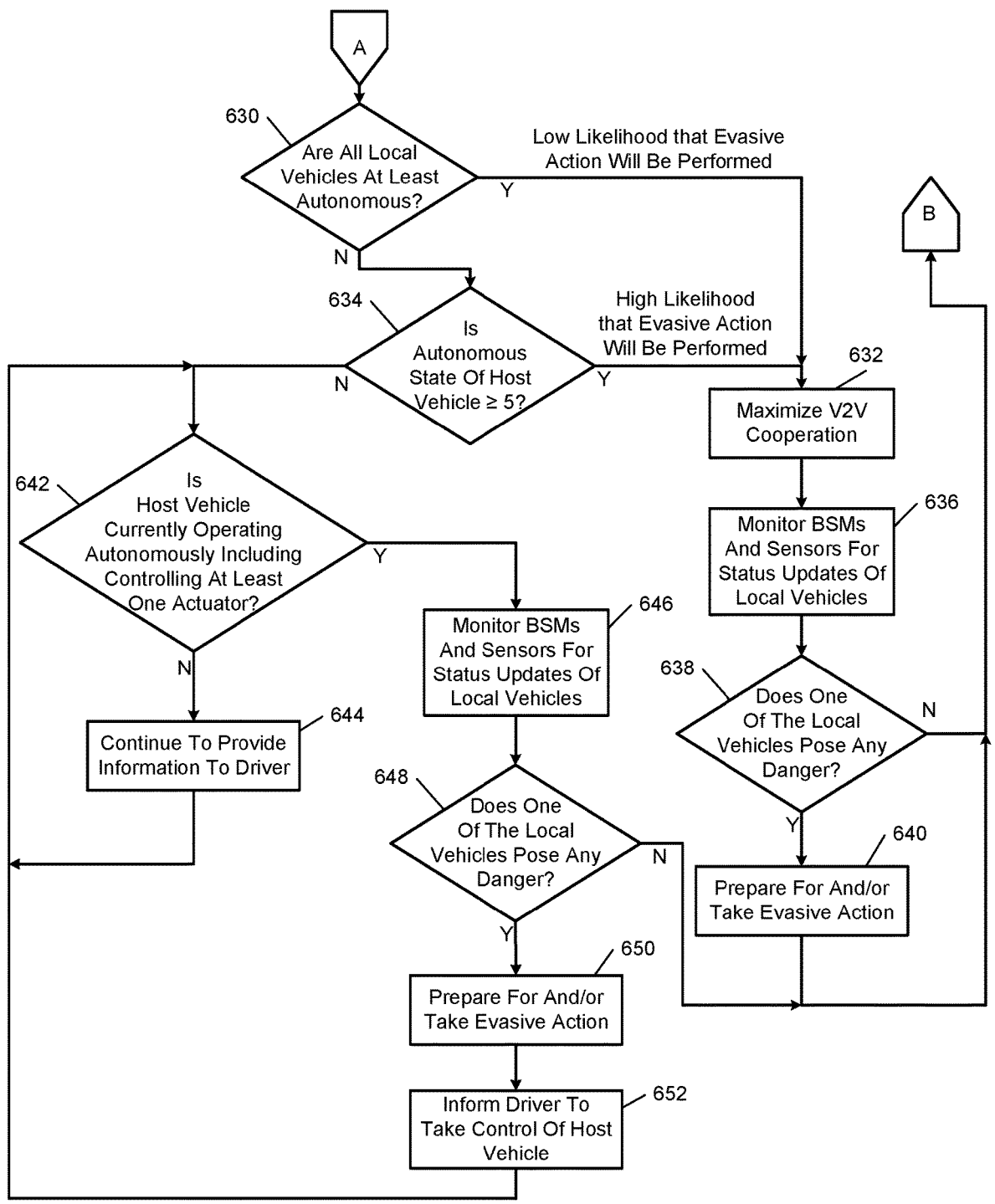

FIGS. 6A and 6B show a driver assistance method that is based on autonomous statuses of vehicles. Although the following operations are primarily described with respect to the implementations of FIG. 6, the operations may be easily modified to apply to other implementations of the present disclosure. The operations may be iteratively performed. In the example of FIG. 6, the host vehicle is capable of operating in one or more semi-autonomous modes and/or a fully autonomous mode.

The method may begin at 600. At 602, the vehicle control module 204 receives inputted destination waypoints. As an example, a driver may enter a destination via the display 220. At 604, the vehicle control module 204 monitors sensors and signals from the GPS receiver 224. At 606, the vehicle control module 204 determines a current location of the host vehicle. This determination may be based on the outputs of the sensors and/or the signals received from the GPS receiver. The location may be stored in the memory 218.

At 608, the vehicle control module 204 determines a route of the host vehicle. The route may be stored in the memory 218. This may be based on the current location, the inputted destination, and/or a heading of the vehicle. At 610, the vehicle control module 204 monitors one or more user input devices (e.g., the display 220), the sensors and the GPS receiver. At 612, the vehicle control module 204 determines whether the route of the host vehicle has changed. If the route has changed, then operation 614 is performed, otherwise operation 610 may be performed.

At 614, the vehicle control module 204 updates the route of the host vehicle. This update may be stored in the memory 218. Operation 620 may be performed subsequent to performing operation 608, 618, and/or 614.

Operations 616 and 618 may be performed while operations 602, 604, 606, 608, 610, 612, and 614 are performed. At 616, the autonomous status module 212 may receive BSMs and/or other messages and/or signals including vehicle information and autonomous status bits from other vehicles, road side devices, and/or other vehicle communication devices. The vehicle control modules of other vehicles may generate BSMs and/or other messages and/or signals including two autonomous status bits as described with respect to the method of FIG. 3. The vehicle control module 204 receives and stores the autonomous status bits as part of the autonomous status database 237. The received messages and/or signals inform the vehicle control module 204 and other vehicle control modules in the driver assistance network (or ad-hoc network) autonomous states of the corresponding vehicles. In another embodiment, the vehicle control modules of other vehicles generate BSMs and/or other messages and/or signals including three autonomous status bits as described with respect to the method of FIG. 4. The other messages and/or signals may be transmitted in addition to transmission of the BSMs. Any number of autonomous status bits may be generated and/or transmitted. The more autonomous status bits generated and transmitted the more levels of autonomous classification and the finer the tuning in on the specific autonomous capabilities of the corresponding vehicles.

The BSMs and/or other messages and/or signals may include vehicle characteristics including vehicle dimensions, vehicle weight, brake pedal status, tire pressures, number of axles in vehicle, etc. The transmission and reception of messages and/or signals other than the BSMs may be transmitted on the same or different channels as the BSMs, which reduces the amount of information transmitted on the channels of the BSMs and as a result prevents "clogging" of the channels of the BSMs and allows for efficient transmission of the BSMs and the other messages and/or signals.

At 618, the vehicle information and autonomous status bits may be stored in the memory 218. The autonomous status bits may be stored as part of the autonomous status database 237. At 620, the vehicle control module 204 may determine which of the detected vehicles and/or vehicles for which BSMs and/or the like were received. Vehicles that are in a local environment (or within a predetermined range) of the host vehicle are local vehicles.

At 622, the autonomous status module 212 and/or the driver assistance module 213 may monitor (i) the BSMs and/or similar messages and/or signals, (ii) the sensors of the host vehicle, and/or (iii) sensor information received from sensors of the local vehicles, to detect any changes associated with the local vehicles. The changes may include changes in autonomous statuses, locations, speeds, acceleration rates, deceleration rates, headings, expected travel paths, etc.

At 624, the autonomous status module 212 and/or the driver assistance module 213 determines whether there are any changes with the local vehicles. This may include comparing vehicle information and autonomous status bits stored in the memory 218 for the local vehicles with updated vehicle information and/or updated autonomous status bits. If there are changes, operation 626 is performed to store the updated vehicle information and/or autonomous status bits, otherwise operation 630 is performed.

At 630, the autonomous status module 212 determines whether all of the local vehicles are at least partially autonomous. If yes, then 632 is performed and there is a low probability that an evasive action will be (e.g., that operation 640 will be performed). If no, operation 634 is performed. At 632, the host vehicle operates along with the local vehicles to maximum V2V cooperation. The driver assistance module of the host vehicle and the driver assistance modules of other autonomous vehicles may be programmed to operate in a cooperative manner. For example, one vehicle may brake/slow down or stop to permit passage of another vehicle. Tasks are performed and timed for the host vehicle and local vehicles to maximize fuel efficiency, traffic flow, safety, etc. Operation 630 may be performed subsequent to operation 632.

At 634, the autonomous status module 212 determines whether the autonomous state of the host vehicle is greater than or equal to 5. If yes, operation 632 is performed there is a high probability that an evasive action will be (e.g., that operation 640 will be performed), otherwise operation 642 is performed. The probability that an evasive action will be performed is higher than if when all of the local vehicles are at least partially autonomous. At 636, the vehicle control module 204 and the autonomous status module 212 monitor (i) the BSMs and/or similar messages and/or signals, (ii) the sensors of the host vehicle, and/or (iii) sensor information received from sensors of the local vehicles, for status updates of the local vehicles and/or non-autonomously controlled ones of the local vehicles. This may include monitoring, for example, path changes, heading changes, speed changes, changes in distance from host vehicle, autonomous status changes, and/or other status changes.

At 638, the driver assistance module 213 determines whether one of the local vehicles poses any danger to the host vehicle. As an example, if one of the local vehicles is within a predetermined range of the host vehicle and is heading towards the host vehicle, then the local vehicle poses a danger to the host vehicle. If none of the local vehicles pose any danger to the host vehicle, operation 622 may be performed, otherwise operation 640 may be performed.

At 640, driver assistance module 213 may take evasive action by performing a countermeasure to prevent a collision. This may include generating warning signals to vehicle occupants, steering and/or decelerating the vehicle and/or transmitting signals to the approaching local vehicle informing the approaching local vehicle of the potential collision such that the approaching local vehicle may also take evasive action. Operation 622 may be performed subsequent to operation 640.

At 642, the autonomous status module 212 determines whether the host vehicle is currently operating in a semi-autonomous mode including controlling at least one actuator of the host vehicle. If the host vehicle is not currently controlling at least one actuator of the host vehicle, then operation 644 is performed, otherwise operation 646 is performed. At 644, information, such as alert signals, guidance signals and/or driver assistance signals are continued to be provided to the driver of the host vehicle. At 644, the vehicle control module 204 may be referred to as operating in a semi-autonomous mode, since the vehicle control module 204 is continuing to provide driver assistance by providing the driver with the stated information.

At 646, the vehicle control module 204 and the autonomous status module 212 monitor (i) the BSMs and/or similar messages and/or signals, (ii) the sensors of the host vehicle, and/or (iii) sensor information received from sensors of the local vehicles, for status updates of the local vehicles and/or non-autonomously controlled ones of the local vehicles. This may include monitoring, for example, path changes, heading changes, speed changes, changes in distance from host vehicle, autonomous status changes, and/or other status changes.

At 648, the driver assistance module 213 determines whether one of the local vehicles poses any danger to the host vehicle. If none of the local vehicles pose any danger to the host vehicle, operation 622 may be performed, otherwise operation 650 may be performed.

At 650, driver assistance module 213 may take evasive action by performing a countermeasure to prevent a collision. This may include generating warning signals to vehicle occupants, steering and/or decelerating the vehicle and/or transmitting signals to the approaching local vehicle informing the approaching local vehicle of the potential collision such that the approaching local vehicle may also take evasive action. At 652, the driver assistance module 213 may inform the driver to or request that the driver take control of the host vehicle. Operation 642 may be performed subsequent to operation 652.

The above-described operations of FIGS. 3-6 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The number of autonomous vehicles on the roadways is expected to increase over time. Through vehicle-to-vehicle (V2V) communication and V2X communication, the autonomous vehicles will exhibit cooperative behavior to improve vehicle safety, fuel efficiency and traffic flow. The more advanced vehicles will cooperate more fully with or without assistance of infrastructure (or vehicle-to-infrastructure (V2I) communication). The ad-hoc networking of vehicles while traveling to share autonomous status information as disclosed herein allows a host vehicle to have information indicating the autonomous capabilities of local vehicles at any point in time and/or while the vehicle is at any location. With this information, autonomous vehicles may maintain full cooperative behavior with a maximum benefit to local traffic. The level of cooperation changes based on the number and locations of vehicles under human control. Some lower level autonomous vehicles may request a driver to take control of the vehicle in certain circumstances as a precaution. Under these lower levels of cooperation, an autonomous vehicle may rely more heavily on outputs of local sensors than on V2X communication.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof.

The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for a host vehicle, the system comprising:
   a memory configured to store one or more applications and autonomous status bits for each of one or more local vehicles, wherein the autonomous status bits of each of the one or more local vehicles indicate whether the corresponding local vehicle is operating in a non-autonomous mode, a semi-autonomous mode, or a fully autonomous mode; and a vehicle control module configured to execute the one or more applications and when executing the one or more applications the vehicle control module is configured to
generate autonomous status bits indicative of an autonomous status level of the host vehicle and transmit the autonomous status bits in at least one message to a first one or more vehicle communication devices,
determine that one or more of the local vehicles is in a local environment of the host vehicle,
receive one or more messages including the autonomous status bits of the one or more local vehicles from a second one or more vehicle communication devices, wherein the second one or more vehicle communication devices includes the first one or more vehicle communication devices, and
unless operating in a fully autonomous mode, generate a request for a driver of the host vehicle to take control of the host vehicle based on (i) the autonomous status bits of the host vehicle, and (ii) the autonomous status bits of the one or more local vehicles.

2. The system of claim 1, wherein:
while the host vehicle and the one or more local vehicles are operating in a fully autonomous mode, the system is able to cooperate more fully with systems of the one or more local vehicles, with knowledge that all vehicles within a predetermined distance of the host vehicle are operating in a fully autonomous mode, than when not all of the vehicles within the predetermined distance of the host vehicle are operating in a fully autonomous mode; and
the vehicle control module is able to determine that all the vehicles within the predetermined distance of the host vehicle are operating autonomously based on received autonomous status bits of all the vehicles within the predetermined distance of the host vehicle.

3. The system of claim 1, wherein the vehicle control module is configured to generate the request for the driver of the host vehicle to take control of the host vehicle based on whether the host vehicle is operating in an autonomous mode.

4. The system of claim 1, wherein the vehicle control module is configured to generate the request for the driver of the host vehicle to take control of the host vehicle based on whether the one or more local vehicles are operating in the non-autonomous mode.

5. The system of claim 1, wherein the vehicle control module is configured to generate the request for the driver of the host vehicle to take control of the host vehicle based on a current operating environment and a current condition of the host vehicle.

6. The system of claim 1, wherein:
the vehicle control module transitions between operating (i) autonomously and controlling at least one actuator of the host vehicle, and (ii) not controlling the at least one actuator of the host vehicle; and
the vehicle control module is configured to, while executing the one or more applications
determine whether the vehicle control module is controlling the at least one actuator of the host vehicle, and
continue to provide information to the driver while the vehicle control module is not controlling any actuator of the host vehicle.

7. The system of claim 6, wherein the vehicle control module is configured to, while executing the one or more applications and while controlling the at least one actuator of the host vehicle:
monitor additional messages received from the one or more vehicles including autonomous status bits of the one or more local vehicles provided in the additional messages;
monitor sensors of the host vehicle;
based on the additional messages, the autonomous status bits of the additional messages, and outputs of the sensors, determine whether the one or more vehicles pose a danger to the host vehicle; and
if the one or more vehicles pose a danger to the host vehicle, informing the driver to take control of the host vehicle.

8. The system of claim 1, wherein the vehicle control module is configured to, while executing the one or more applications:
determine whether the one or more vehicles are operating autonomously;
if the one or more vehicles are operating autonomously, operate in a cooperative behavior with vehicle control modules of the one or more vehicles; and
if the one or more vehicles are not operating autonomously, determine whether a current autonomous state of the host vehicle is greater than or equal to a predetermined autonomous status level.

9. The system of claim 8, wherein the predetermined autonomous status level corresponds to operating in the fully autonomous mode.

10. The system of claim 8, wherein the vehicle control module is configured to, while executing the one or more applications and if the current autonomous state of the host vehicle is greater than or equal to the predetermined autonomous status level:
monitor additional messages received from the one or more vehicles including autonomous status bits of the one or more local vehicles provided in the additional messages;
monitor sensors of the host vehicle; and
based on the additional messages, the autonomous status bits of the additional messages, and outputs of the sensors, determine whether the one or more vehicles pose a danger to the host vehicle.

11. The system of claim 10, wherein the vehicle control module is configured to, while executing the one or more applications and if the one or more vehicles pose a danger to the host vehicle:
prepare for or take evasive action if the one or more vehicles pose a danger to the host vehicle; and
determine if the one or more vehicles continue to operate autonomously if the one or more vehicles do not pose a danger to the host vehicle.

12. A method for a host vehicle, the method comprising:
storing one or more applications and autonomous status bits for each of one or more local vehicles in a memory, wherein the autonomous status bits of each of the one or more local vehicles indicate whether the corresponding local vehicle is operating in a non-autonomous mode, a semi-autonomous mode, or a fully autonomous mode;
generating autonomous status bits indicative of an autonomous status level of the host vehicle and transmit the autonomous status bits in at least one message to a first one or more vehicle communication devices;

determining that one or more of the local vehicles is in a local environment of the host vehicle;

receiving one or more messages including the autonomous status bits of the one or more local vehicles from a second one or more vehicle communication devices, wherein the second one or more vehicle communication devices includes the first one or more vehicle communication devices; and unless operating in the fully autonomous mode, generating a request for a driver of the host vehicle to take control of the host vehicle based on (i) the autonomous status bits of the host vehicle, and (ii) the autonomous status bits of the one or more local vehicles.

13. The method of claim 12, wherein the request for the driver of the host vehicle to take control of the host vehicle is generated based on whether the one or more local vehicles are operating in the non-autonomous mode.

14. The method of claim 12, wherein the request for the driver of the host vehicle to take control of the host vehicle is generated based on a current operating environment and a current condition of the host vehicle.

15. The method of claim 12, further comprising:
transitioning a vehicle control module between operating (i) autonomously and controlling at least one actuator of the host vehicle, and (ii) not controlling the at least one actuator of the host vehicle;
determining whether the vehicle control module is controlling the at least one actuator of the host vehicle; and
continuing to provide information to the driver while the vehicle control module is not controlling any actuator of the host vehicle.

16. The method of claim 15, further comprising while controlling the at least one actuator of the host vehicle:
monitoring additional messages received from the one or more vehicles including autonomous status bits of the one or more local vehicles provided in the additional messages;
monitoring sensors of the host vehicle;
based on the additional messages, the autonomous status bits of the additional messages, and outputs of the sensors, determining whether the one or more vehicles pose a danger to the host vehicle; and
if the one or more vehicles pose a danger to the host vehicle, informing the driver to take control of the host vehicle.

17. The method of claim 12, further comprising:
determining whether the one or more vehicles are operating autonomously;
if the one or more vehicles are operating autonomously, operating in a cooperative behavior with vehicle control modules of the one or more vehicles; and
if the one or more vehicles are not operating autonomously, determining whether a current autonomous state of the host vehicle is greater than or equal to a predetermined autonomous status level.

18. The method of claim 17, wherein the predetermined autonomous status level corresponds to operating in the fully autonomous mode.

19. The method of claim 17, further comprising if the current autonomous state of the host vehicle is greater than or equal to the predetermined autonomous status level:
monitoring additional messages received from the one or more vehicles including autonomous status bits of the one or more local vehicles provided in the additional messages;
monitoring sensors of the host vehicle; and
based on the additional messages, the autonomous status bits of the additional messages, and outputs of the sensors, determining whether the one or more vehicles pose a danger to the host vehicle.

20. The method of claim 19, further comprising while executing the one or more applications and if the one or more vehicles pose a danger to the host vehicle:
preparing for or take evasive action if the one or more vehicles pose a danger to the host vehicle; and
determining if the one or more vehicles continue to operate autonomously if the one or more vehicles do not pose a danger to the host vehicle.

* * * * *